April 9, 1963　　B. HELMING ETAL　　3,084,878
SHAFT COOLER
Filed Feb. 10, 1961

Inventors
Bernd Helming
Gunter Schultz
By Arthur M. Streich
Attorney

3,084,878
SHAFT COOLER
Bernd Helming, Neubeckum, Westphalia, and Gunter Schultz, Ahlen, Westphalia, Germany, assignors to Allis-Chalmers Manufacturing Company, Milwaukee, Wis.
Filed Feb. 10, 1961, Ser. No. 88,407
Claims priority, application Germany Feb. 12, 1960
3 Claims. (Cl. 241—47)

This invention relates to cooling granular material with gases. The invention is particularly useful for cooling the products of rotary kilns, and in particular cement clinker.

For cooling material that has been submitted to heat treatment in a rotary kiln, a type of cooler known as a countercurrent cooler has been developed. In this type of cooler, heated material is deposited in a vertical shaft and removed from the bottom of the shaft to provide a continuously descending column of the material. Cooling air is supplied beneath the column of material and is blown upwardly through the descending column. The material to be cooled moves downwardly and the cooling air upwardly through the shaft and hence the name countercurrent cooler. Since all of the cooling air passes through a column of hot material, the air is raised to a very high temperature. As the air passes upwardly through a countercurrent cooler, the coolest air comes in contact first with the coolest of the material in the column and as it travels upwardly through the column the air becomes warmer as it reaches levels of hotter material in the column. The cooling air finally passes from the top of the column and into the kiln. Since the last material that the cooling air comes in contact with before entering the furnace is the high temperature material just discharged from the kiln, the cooling air admitted to the bottom of the column is steadily and continuously heated to a high temperature as it passes upwardly through the column.

A vertical rotary shaft countercurrent cooler mounted eccentrically beneath the discharge end of the rotary kiln, has occasionally been used and by this eccentric arrangement a very good distribution of the stock across the entire cross sectional area of the cooler has been attained. Because of this even distribution the upstream current of cooling air encounters an equal resistance to its flow all across the area, which in turn results in uniform cooling of the entire stock. It is also important to note that a separation of the stock in the cooler into areas of coarse and fine grains at the top of the column does not occur with this arrangement. It is possible in most cases to achieve satisfactory particle distribution without installing separate special mechanical distributing devices for spreading the feed evenly on the top of the column.

In one type of vertical rotary shaft countercurrent cooler, as shown in U.S. Patent 2,861,353, the shell of the rotating cooler shaft is rigidly connected at the bottom to a spoke-wheel type discharge carrier which rotates together with the cooler shaft. A stationary grate is mounted below the aforementioned carrier. For discharging the cooled stock that has not dropped between the grate bars, there is provided a wide slit in the grate, reaching from its center to the periphery of the grate itself and in addition there is a type of paring bar mounted above the slit of the grate, whereby an easier discharging of the stock is attained.

This type of cooler construction is especially well suited for stock which is not too hard, for instance lime which can be broken down to a small size by means of a moderate pressure. In order to make this cooler also suitable for cement clinker, which is a material of widely fluctuating particle size and requires much more power for its disintegration because of its extreme hardness, proposals have also been made to equip the carrier spokes with crusher teeth on their bottom surfaces as well as to provide the upper sides of the grate bars with such teeth. By this method a disintegration of the larger lumps of the clinker can be attained and with the result that both the fine grains and the disintegrated larger lumps can be discharged together through the slots between the grate bars.

The present invention relates to an improved countercurrent cooler of the type so far described and in which the stationary grate and rotary spokes each carry a structure that cooperates with each other to define a comminution space therebetween where lumps larger than predetermined maximum size are retained until they have been both reduced in size and further cooled to obtain the maximum heat recovery.

For the type of cooler involved in this invention there is only one possibility for controlling the discharge of stock from the cooler and that is by changing the rate of revolution of the cooler. But, as the relatively large lumps first have to be crushed to smaller sizes before leaving the cooler, the passing of the lumps through the cooler will be slower than the fine grains which will trickle through at a comparatively fast speed. This property of the cooler construction can be very disadvantageous, particularly when the stock being fed into the cooler fluctuates widely in particle size. It can then happen that in instances of a very high proportion of fine grains in the stock the fine grains will pass through the cooler so rapidly that the stock level in the cooler bin will be lowered considerably and the grains will be insufficiently cooled. Likewise, during periods of feeding excessively high proportions of coarse particles a noticeable drop of the discharge rate will take place, which in turn will result in the level of stock in the cooler being raised above the desired level.

But fluctuations of the stock level inside the cooler bin mean a change of the cooler capacity as well as a change in the temperature to which the cooling air is preheated before it enters the kiln which, of course, subjects the entire kiln operation to such fluctuations. In all such cases it becomes necessary therefore to adjust immediately the revolution rate of the cooler. These revolutions of the cooler have to be continuously adjusted for the prevailing composition of the clinker as it enters the charging end of the cooler. Watching the operation of the cooler constantly is therefore a necessity. Another result of fluctuations of the stock level is excessive and heavy wear of the grates, especially since larger lumps remain on the grate for longer periods, that is until they are sufficiently crushed, thus exposing the grate during such times to high frictional stresses.

The object of the present invention is to eliminate the aforementioned disadvantages. To eliminate these disadvantages the present invention provides improved stock discharging structure at the bottom of the column. This improved structure, which will be described in detail with reference to an accompanying drawing, provides an improved arrangement for crushing oversize lumps along with a plate beneath the crusher discharge opening for supporting the entire column of cooler stock and scraper arms for removing regulated amounts of stock from the column over the plate.

The invention will be better understood by reference to the following detailed description of an apparatus according to the present invention as particularly applied to cooling cement clinker or the like discharged from a rotary kiln and this description is to be considered together with the drawing in which.

Figure 1:
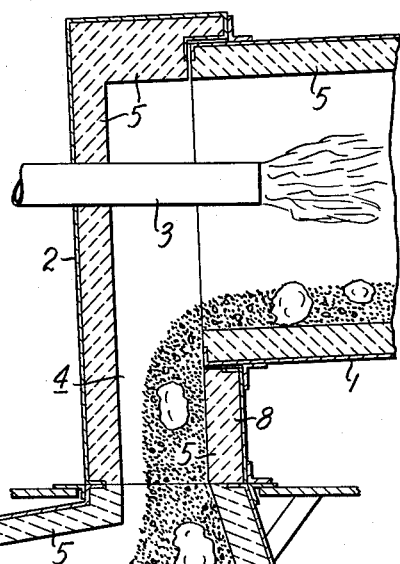
FIG. 1 is a vertical cross section view of apparatus embodying the invention.

Referring to the drawing, an embodiment of the present invention is shown in which a granular material such as cement clinker is received from a rotary kiln to be cooled. A portion of the discharge end of the kiln assembly is shown having a rotatable cylinder 1. The open end of cylinder 1 is enclosed by a firing hood 2. A burner 3 projects through a front wall portion of the firing hood and extends into the cylinder 1. Fuel is introduced into the cylinder 1 through the burner 3 and burned within the cylinder 1 to create the temperatures necessary to burn material such as the raw materials that produce cement clinker.

As granular material is advanced through the cylinder 1 from the feed end (not shown) to the discharge end of the cylinder enclosed by the firing hood, the material is progressively heated until at the point of discharge from cylinder 1 into firing hood 2 it may be white hot. From the cylinder 1 the hot material is dropped through a passage 4 defined by the firing hood 2, a collar 8 and is deposited in a cooler 9.

Figure 2:
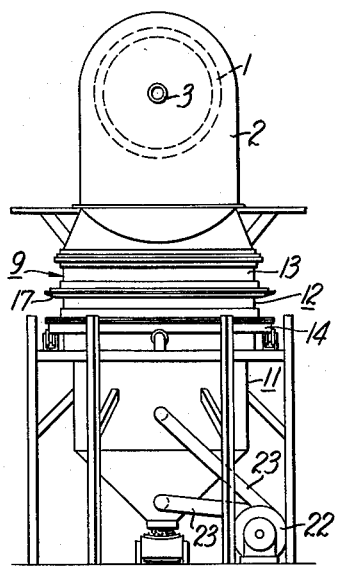
FIG. 2 is a vertical end view of the apparatus shown in FIG. 1.

The cooler 9 includes a first assembly 11 and a second assembly 12 mounted over the first assembly 11. The first assembly 11 serves as both a bin and a wind box in a manner that will appear as the description proceeds. The second assembly 12 includes a shaft 13 carried by a circular track assembly 14. The shaft 13 is rotated on the circular track assembly 14 by a variable speed electric motor 15 which is drivingly connected to shaft 13 by means of a pinion gear 16 that is driven by the motor 15 and meshes with a ring gear 17 secured around shaft 13 to rotate the shaft about its central axis. A controller 18 is provided to control the speed of the motor 15 which drives the shaft 13. One or more blowers such as shown at 22 in FIG. 2 may be connected by conduits 23 to the first assembly 11 which thereby acts as a wind box for directing cooling air upwardly from the wind box or a first assembly 11 through the shaft 13.

The collar 8 and the hood structure 2 which cooperate to define the discharge passage 4 from the kiln 1 to the cooler 9, provide for discharging the hot material near the periphery of the shaft 13. The cylinder 1, hood 2, passage 4, collar 8, and shaft 13 are all lined with a refractory material 5 which is usually firebrick.

Figure 3:
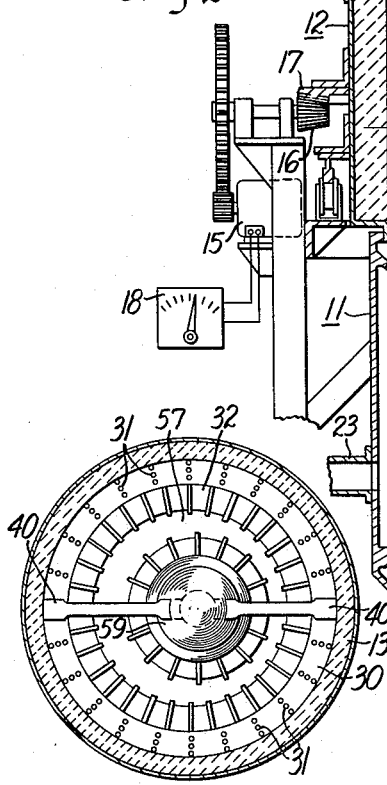
FIG. 3 is a view taken along line III—III in FIG. 1 looking in the direction indicated by the arrows.

Discharge means 29 are provided for discharging material from the shaft 13 to the bin and wind box assembly 11. The discharge means 29 includes both the following described structure that is supported by the assembly 11 and structure that is supported by the assembly 12. A downwardly pointed frusto-conical grate 30 having apertures 31 is supported by the bin and wind box assembly 11. A plurality of arms 40 arranged like spokes of a wheel are supported by the second assembly 12. The arms 40 are adjacent the lower end of shaft 13 and connected to circumferentially spaced points on the shaft as may be seen in FIG. 3. Each of the arms 40 extends inwardly to a hub 41.

Inside the cooler the spokes or arms 40 connect cooler shaft 13 rigidly with hub 41, the latter being mounted eccentrically to the rotational axis of the cooler. A shaft 42 is keyed at 43 rigidly to hub 41. The other end of the shaft 42 has a concentrically positioned neck 44 and at its end, pivot 45 which is guided by and revolves in foot bearing 46. Shaft 42 rotates together with the cooler shaft 13 and it describes a circle with its eccentricity as radius.

A downwardly pointed frusto-conical shell 32 is suspended from grate 30. The shell 32 may be reinforced with arms extending between the outer surface of shell 32 and the inner surface of bin 11. In addition bin 11 is provided with support spokes 33 which in turn support the bearing 46 that carries pivot 45.

A bearing 47 is journaled on the rotating shaft 42. A crusher cone 48 is held in spaced relationship around bearing 47 by ribs 49. The crusher cone 48 may be reinforced by increasing the number of ribs 49.

A hub 56 is rigidly keyed on to neck 44 of crusher cone shaft 42. This hub supports an annular discharge plate 57 by means of braces 58. The discharge plate 57 rotates together with crusher cone shaft 42 and with cooler shaft 13. An air baffle 59 is carried by spokes 40, over the cone 48. One or more scraper arms 60 arranged above plate 57 can be regulated radially in the customary way, for example as shown in U.S. Patent 2,861,356.

The operation of the device is as follows:

Cooler shaft 13 rotates when motor 15 drives gears 16, 17, causing the rotation of hub 41 which is rigidly joined to shaft 13 by spokes 40. Since hub 41 is keyed to schaft 42 and shaft 42 is in turn rigidly connected to plate 57, it follows that shaft 13, spokes 40, air baffle 59, hub 41, shaft 42 and plate 57 all rotate together. Since shaft 42 is journaled to rotate freely within bearing 47, shaft 42 will not drive cone 48. Furthermore, the relatively small amount of friction between shaft 42 and bearing 47 will not cause cone 48 to turn because of the greater frictional contact of stock passing between cone 48 and shell 32. The rotation of shaft 42 will, however, cause cone 48 to gyrate with the space enclosed by shell 32. During the rotation of the crusher cone shaft 42 and the resulting gyration of cone 48 the opening between cone 48 and shell 32 widens and narrows continuously, thus achieving a crushing action.

The stock inside the cooler shaft 13 rotates together with the cooler shaft and spokes 40. During the rotation the stock moves slowly downwards. After passing spokes 40 the stock comes within reach of the stationary shell 32 and the gyrating crusher cone 48. The continuous gyrating action of cone 48 and the resulting narrowing and widening of the crusher opening causes a disintegration to take place and the particle size of the stock to reduce to such a degree that it will pass through the narrowest sectional area of the crusher opening and to be discharged on plate 57 from where it is in turn discharged by the action of scraper arm 60, into the bottom of bin 11.

As the stock drops slowly through the opening between cone 48 and shell 32 every particle has to reach the narrowest spot at least once before leaving the crusher. On being discharged into the bottom of bin 11 the stock is therefore reduced to a size governed by this action. The fine grains drop at the same rate of speed as the coarse ones. By means of plate 57 a premature trickling of the fine pieces is avoided.

A portion of the cooling air which enters bin 11 through conduits 23 passes through grate 30 directly into the space of the cooler shaft 13. After descending the shaft 13 the stock will be cooled considerably before reaching the crusher 48, 32. Only the larger lumps of stock have a higher core temperature. But since the fine portion of the stock cannot trickle away between these larger lumps there is a constant heat exchange going on and it is caused by the contact between the coarse and the fine particles. As a result there is no marked difference in temperature between the different sizes of particles.

After dropping into the bottom of bin 11, the disintegrated stock is subjected to an additional heat exchange that takes place between some still warmer and larger pieces that had just been disintegrated and the remainder of the stock. In this way uniformly cooled stock will be discharged from the cooler.

The air current which passes through material in the bottom of bin 11 flows mostly inside the crusher cone 48 where it simultaneously cools bearing 47 and enters, after first passing air baffle 59, the column of stock above grate 30. The entering air currents can be regulated individually, as required, for example with dampers (not shown).

Since the heat between the stock and the air is exchanged solely by countercurrent, cooling of the stock to the lowest possible temperature and preheating of the cooling air to the highest possible temperature before entering the kiln will be attained.

From the foregoing it will be apparent that the illustrated embodiment of the invention provides an improved apparatus for cooling material such as cement clinker discharged from a kiln and accordingly accomplishes the objects of the invention. On the other hand it will also be obvious to those skilled in the art that the invention may be utilized to advantage in the treating of any granular material with a gas and therefore the disclosure herein is illustrative only and the invention is not intended to be limited thereto.

What is claimed is:

1. In an apparatus for cooling granular material, a stationary bin and wind box assembly, a rotatable assembly including a vertical cylindrical shaft mounted over said stationary assembly, a motor connected to said rotatable assembly to rotate said shaft about a central axis passing therethrough, means for delivering and discharging material to be treated into the top and near the periphery of said shaft, a blower connected to said stationary assembly for blowing gases upwardly through said shaft to cool said material, and discharge means comprising an annular grate supported by said stationary assembly, a plurality of arms adjacent the lower end of said shaft and connected to circumferentially spaced points on said shaft, each of said arms extending inwardly of said shaft, a shell suspended from the inward rim of said annular grate, and a crushing cone supported by said stationary and rotatable assemblies projecting upwardly into said shell, the relative movement between said assemblies imparting a gyrating crushing movement to said cone relative to said shell, said shell being spaced apart from said cone to define therebetween comminution space where lumps larger than predetermined maximum size are retained until they are both reduced in size and further cooled, and a generally horizontal annular plate spaced beneath said comminution space and connected to said shaft arms to turn therewith, said plate thereby partially blocking and slowing the rate of discharge from said comminution space.

2. In an apparatus for cooling granular material, a stationary bin and wind box assembly, a rotatable assembly including a vertical shaft mounted over said stationary assembly, a motor connected to said rotatable assembly to rotate said shaft relative to the first assembly and about a central axis passing therethrough, means for delivering and discharging material to be treated to the top and near the periphery of said shaft, discharge means comprising an annular grate supported by said stationary assembly, a plurality of spokes adjacent the lower end of said shaft and connected to circumferentially spaced points on said shaft, each of said spokes extending inwardly toward the central axis of said shaft, a downwardly pointed frusto-conical shell suspended from the inner rim of said annular grate with the central axis of said shell in a vertical position, a vertically arranged solid shaft supported by said stationary assembly for rotation relative thereto and projecting upwardly into said shell, said solid shaft being connected to the radially inner ends of said shaft arms to be turned by said cylindrical shaft and arms about a vertical axis, said solid shaft having a midportion eccentric to said vertical axis, a bearing carried by and journaled for rotation of said solid shaft therein, a crusher cone mounted in radially spaced relation around about said solid shaft by rib structure extending therebetween, an air discharge baffle carried by said shaft arms over said crusher cone, a generally horizontal annular plate spaced beneath said comminution space and connected to said solid shaft to turn therewith, said plate thereby partially blocking and slowing the discharge from said comminution space, and a blower connected to said stationary assembly for blowing cooling air upwardly through said annular grate and upwardly within said crusher cone to discharge through said baffle with both said grate air and cone air continuing on upward through the column of material within said cylindrical shaft.

3. In an apparatus for cooling granular material, a stationary bin and wind box assembly, a rotatable assembly including a vertical shaft mounted over said stationary assembly, a motor connected to said rotatable assembly to rotate said shaft relative to the first assembly and about a central axis passing therethrough, means for delivering and discharging material to be treated to the top and near the periphery of said shaft, discharge means comprising an annular grate supported by said stationary assembly, a plurality of spokes adjacent the lower end of said shaft and connected to circumferentially spaced points on said shaft, each of said spokes extending inwardly toward the central axis of said shaft, a downwardly pointed frusto-conical shell suspended from the inner rim of said annular grate with the central axis of said shell in a vertical position, a vertically arranged solid shaft supported by said stationary assembly for rotation relative thereto and projecting upwardly into said shell, said solid shaft being connected to the radially inner ends of said shaft arms to be turned by said cylindrical shaft and arms about a vertical axis, said solid shaft having a mid-portion eccentric to said vertical axis, a bearing carried by and journaled for rotation of said solid shaft therein, a crusher cone mounted in radially spaced relation around about said solid shaft by rib structure extending therebetween, an air discharge baffle carried by said shaft arms over said crusher cone, a generally horizontal annular plate spaced beneath said comminution space and connected to said solid shaft to turn therewith, said plate thereby partially blocking and slowing the discharge from said comminution space, a scraper arm supported by said stationary assembly and projecting between said shell and said plate to push material off said plate and provide a regulated discharge and a blower connected to said stationary assembly for blowing cooling air upwardly through said annular grate and upwardly within said crusher cone to discharge through said baffle with both said grate air and cone air continuing on upward through the column of material within said cylindrical shaft.

References Cited in the file of this patent

UNITED STATES PATENTS

| | | |
|---|---|---|
| 1,047,859 | Traylor | Dec. 17, 1912 |
| 1,725,226 | Taylor | Aug. 20, 1929 |
| 2,861,353 | Lellep | Nov. 25, 1958 |
| 2,861,356 | Lellep | Nov. 25, 1958 |